United States Patent
Tsai et al.

(10) Patent No.: US 11,582,790 B2
(45) Date of Patent: Feb. 14, 2023

(54) USER EQUIPMENT AND METHOD FOR SMALL DATA TRANSMISSION

(71) Applicant: FG Innovation Company Limited, Tuen Mun (HK)

(72) Inventors: Hsin-Hsi Tsai, Taipei (TW); Heng-Li Chin, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/356,832

(22) Filed: Jun. 24, 2021

(65) Prior Publication Data
US 2021/0410180 A1     Dec. 30, 2021

Related U.S. Application Data

(60) Provisional application No. 63/043,734, filed on Jun. 24, 2020.

(51) Int. Cl.
*H04W 72/14*     (2009.01)
*H04W 72/1263*   (2023.01)
(Continued)

(52) U.S. Cl.
CPC .......... *H04W 72/14* (2013.01); *H04L 1/1819* (2013.01); *H04W 24/08* (2013.01);
(Continued)

(58) Field of Classification Search
CPC ..... H04W 72/14; H04W 76/30; H04W 76/11; H04W 24/08; H04W 72/042; H04W 72/1263; H04L 1/1819
(Continued)

(56) References Cited

U.S. PATENT DOCUMENTS

2016/0249155 A1     8/2016   Anev et al.
2020/0367310 A1*   11/2020   Jung ................... H04W 76/15
(Continued)

FOREIGN PATENT DOCUMENTS

CN    105706519 A     6/2016
WO    2020/088097 A1  5/2020

OTHER PUBLICATIONS

Intel, "Solution for non-IP small data transmission via SCEF", S2-152809, SA WG2 Meeting #110ah, Sophia Antipolis, France, Aug. 31-Sep. 3, 2015.
(Continued)

*Primary Examiner* — Obaidul Huq
(74) *Attorney, Agent, or Firm* — ScienBiziP, P.C.

(57) ABSTRACT

A user equipment (UE) and a method for small data transmission (SDT) are provided. The method includes receiving a Radio Resource Control (RRC) release message from a Base Station (BS), the RRC release message indicating an SDT configuration including a Configured Grant (CG) configuration and a timer; initiating a transmission on an Uplink (UL) resource while the UE is in an RRC_INACTIVE state, the UL resource being either configured by the CG configuration or scheduled by a UL grant from the BS; starting or restarting the timer after initiating the transmission; and monitoring a Physical Downlink Control Channel (PDCCH) addressed to a specific Radio Network Temporary Identifier (RNTI) on a specific search space while the timer is running.

20 Claims, 5 Drawing Sheets

(51) Int. Cl.
  *H04W 24/08*  (2009.01)
  *H04L 1/1812* (2023.01)
  *H04W 76/30*  (2018.01)
  *H04W 76/11*  (2018.01)
  *H04W 72/04*  (2023.01)

(52) U.S. Cl.
  CPC ..... *H04W 72/042* (2013.01); *H04W 72/1263* (2013.01); *H04W 76/11* (2018.02); *H04W 76/30* (2018.02)

(58) Field of Classification Search
  USPC .......................................... 370/310, 328, 329
  See application file for complete search history.

(56) References Cited

U.S. PATENT DOCUMENTS

2021/0227575 A1* 7/2021 Ou ........................ H04W 76/11
2022/0232659 A1* 7/2022 Kim .................. H04W 72/1289

OTHER PUBLICATIONS

3GPP TS 38.321, "3rd Generation Partnership Project; Technical Specification Group Radio Access Network; NR Medium Access Control (MAC) protocol specification (Release 16)", V16.0.0 (Mar. 2020).

3GPP TS 38.214, "3rd Generation Partnership Project; Technical Specification Group Radio Access Network; NR Physical layer procedures for data (Release 16)", V16.0.0 (Dec. 2019).

3GPP TS 38.322 , "3rd Generation Partnership Project; Technical Specification Group Radio Access Network; NR Radio Link Control (RLC) protocol specification (Release 16)", V16.0.0 (Mar. 2020).

3GPP TS 38.300, "3rd Generation Partnership Project; Technical Specification Group Radio Access Network; Nr; Nr and NG-RAN Overall Description; Stage 2 (Release 16)", V16.1.0 (Mar. 2020).

3GPP TS 38.331, "3rd Generation Partnership Project; Technical Specification Group Radio Access Network; NR Radio Resource Control (RRC) protocol specification (Release 16)", V16.0 0 (Mar. 2020).

\* cited by examiner

USER EQUIPMENT AND METHOD FOR SMALL DATA TRANSMISSION

CROSS-REFERENCE TO RELATED APPLICATION(S)

The present disclosure claims the benefit of and priority to provisional U.S. Patent Application Ser. No. 63/043,734, filed on Jun. 24, 2020, entitled "FEEDBACK FOR UL DATA TRANSMISSION IN RRC INACTIVE," the content of all of which is hereby incorporated fully by reference herein into the present disclosure for all purposes.

FIELD

The present disclosure is related to wireless communication, and specifically, to small data transmission (SDT) in cellular wireless communication networks.

BACKGROUND

Abbreviations used in this disclosure include:
Abbreviation Full name
5GC 5G Core
ACK Acknowledgement
AMF Access and Mobility Management Function
ARQ Automatic Repeat Request
AS Access Stratum
BS Base Station
BSR Buffer Status Report
BWP Bandwidth Part
CA Carrier Aggregation
CBRA Contention Based Random Access
CCCH Common Control Channel
CE Control Element
CFRA Contention Free Random Access
CG Configured Grant
CM Connection Management
CN Core Network
CORESET Control Resource Set
C-RNTI Cell Radio Network Temporary Identifier
CRC Cyclic Redundancy Check
CS-RNTI Configured Scheduling Radio Network Temporary Identifier
CSI-RS Channel Status Information-Reference Signal
DCI Downlink Control Information
DFI Downlink Feedback Information
DG Dynamic Grant
DL Downlink
DRB Data Radio Bearer
DRX Discontinuous Reception
DTX Discontinuous Transmission
HARQ Hybrid Automatic Repeat Request
ID Identifier/Identity
I-RNTI Inactive RNTI
L1 Layer 1
L2 Layer 2
L3 Layer 3
LCH Logical Channel
MAC Medium Access Control
MCG Master Cell Group
MCS Modulation and Coding Scheme
MIB Master Information Block
MSG Message
NACK Negative Acknowledgement
NAS Non-Access Stratum
NDI New Data Indicator
NG-RAN Next-Generation Radio Access Network
NID Network ID
NR New Radio
NW Network
OFDM Orthogonal Frequency Division Multiplexing
PCell Primary Cell
PCCH Paging Control Channel
PDCCH Physical Downlink Control Channel
PDCP Packet Data Convergence Protocol
PDU Protocol Data Unit
PHY Physical (Layer)
PO Paging Occasion
PRACH Physical Random Access Channel
P-RNTI Paging RNTI
PUCCH Physical Uplink Control Channel
PUR-RNTI Preconfigured Uplink Resource RNTI
PUSCH Physical Uplink Shared Channel
PLMN Public Land Mobile Network
QoS Quality of Service
RACH Random Access Channel
RAN Radio Access Network
Rel Release
RLC Radio Link Control
RNA RAN-based Notification Area
RNTI Radio Network Temporary Identifier
RRC Radio Resource Control
RRM Radio Resource Management
RSRP Reference Signal Received Power
RSRQ Reference Signal Received Quality
RTT Round-Trip Time
SCell Secondary Cell
SCG Secondary Cell Group
SCS Sub Carrier Spacing
SDAP Service Data Adaptation Protocol
SDU Service Data Unit
SFN System Frame Number
SI System Information
SIB System Information Block
SINR Signal to Interference plus Noise Ratio
SLIV Start and Length Indicator
SMTC SSB-based RRM Measurement Timing Configuration
SNPN Stand-alone Non-Public Network
SR Scheduling Request
SRB Signaling Radio Bearer
SSB Synchronization Signal Block
S-TMSI SAE-Temporary Mobile Subscriber Identity
SUL Supplementary Uplink
TA Timing Advance or Time Alignment
TAG Timing Advance Group
TB Transport Block
TBS Transport Block Size
TRP Transmission Reception Point
UCI Uplink Control Information
UE User Equipment
UL Uplink
UPF User Plane Function Various efforts have been made to improve different aspects of wireless communication for cellular wireless communication systems, such as 5G New Radio (NR), by improving data rate, latency, reliability, and mobility. The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC). However, as the demand for radio access continues to increase, there exists a need for further improvements in the art.

SUMMARY

The present disclosure is related to small data transmission (SDT) in cellular wireless communication networks.

According to an aspect of the present disclosure, a UE for SDT is provided. The UE includes one or more processors and at least one memory coupled to at least one of the one or more processors. The at least one memory stores a computer-executable program that, when executed by the at least one of the one or more processors, causes the UE to receive an RRC release message from a BS, the RRC release message indicating an SDT configuration including a CG configuration and a timer; initiate a transmission on a UL resource while the UE is in an RRC_INACTIVE state, the UL resource being either configured by the CG configuration or scheduled by a UL grant from the BS; start or restart the timer after initiating the transmission; and monitor a PDCCH addressed to a specific RNTI on a specific search space while the timer is running According to another aspect of the present disclosure, a method performed by a UE for SDT is provided. The method includes receiving an RRC release message from a BS, the RRC release message indicating an SDT configuration including a CG configuration and a timer; initiating a transmission on a UL resource while the UE is in an RRC_INACTIVE state, the UL resource being either configured by the CG configuration or scheduled by a UL grant from the BS; starting or restarting the timer after initiating the transmission; and monitoring a PDCCH addressed to a specific RNTI on a specific search space while the timer is running In some embodiments, the method performed by the UE for SDT may also include stopping the timer upon receiving an indication from the BS. In some embodiments, the indication may indicate Downlink Feedback Information (DFI). In some embodiments, the indication may indicate a specific UL grant for a new transmission associated with a Hybrid Automatic Repeat Request (HARQ) process used for the transmission.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
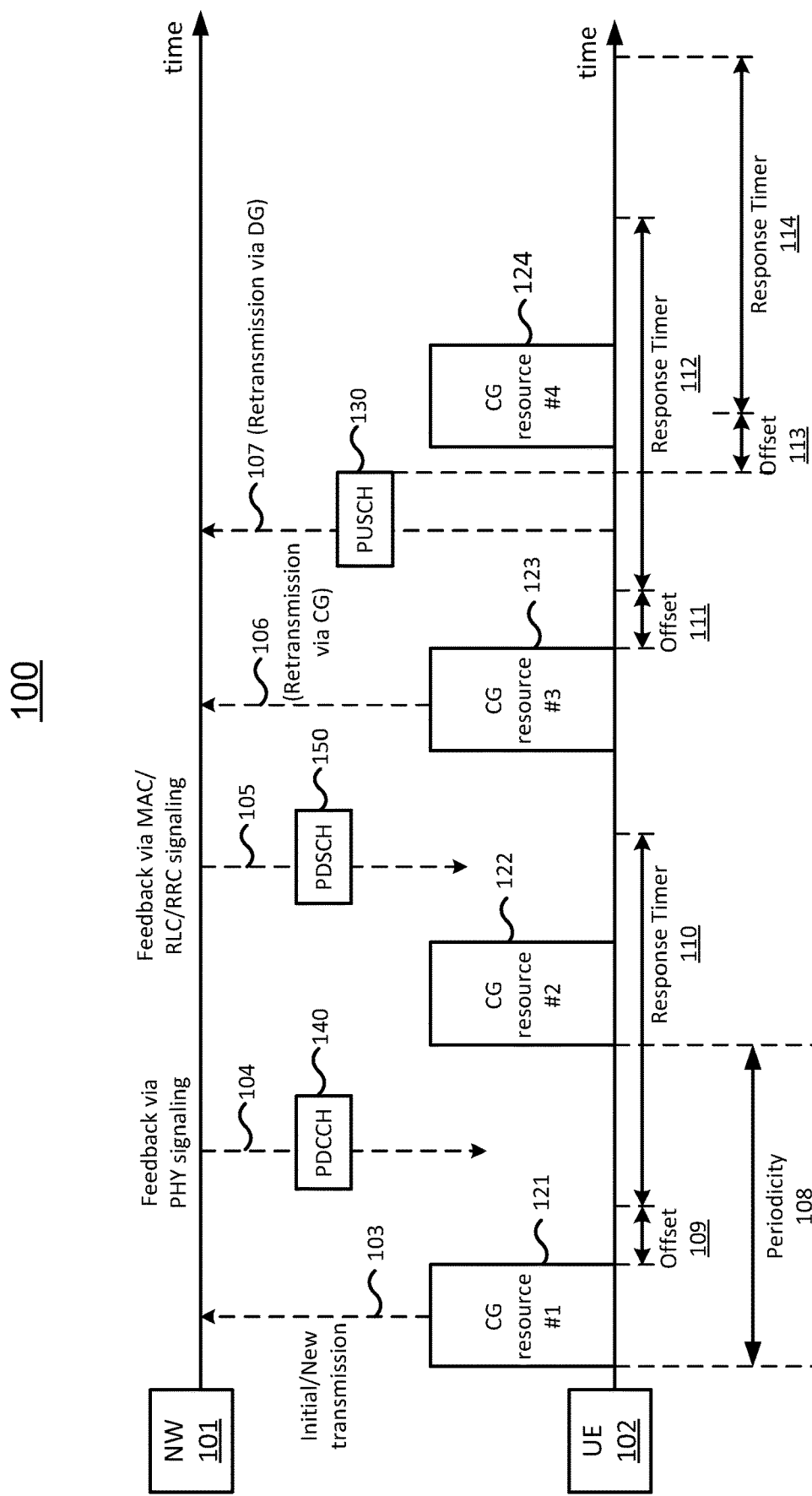
FIG. 1 illustrates a process of SDT via CG, according to an example implementation of the present disclosure.

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may be different in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the so-disclosed combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof.

A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Applications Specific Integrated Circuitry (ASIC), programmable logic arrays, and/or using one or more Digital Signal Processor (DSPs). Although some of the disclosed implementations are oriented to software installed and executing on computer hardware, alternative implementations implemented as firmware or as hardware or as a combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage. The BS can be referred to as network (NW).

Each cell (often referred to as a serving cell) provides services to serve one or more UEs within its radio coverage such that each cell schedules the DL and optionally UL resources to at least one UE within its radio coverage for DL and optionally UL packet transmissions. The BS can communicate with one or more UEs in the radio communication system via the plurality of cells.

A cell may allocate sidelink (SL) resources for supporting Proximity Service (ProSe) or Vehicle to Everything (V2X) service. Each cell may have overlapped coverage areas with other cells.

In Multi-RAT Dual Connectivity (MR-DC) cases, the primary cell of a Master Cell Group (MCG) or a Secondary Cell Group (SCG) may be called a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), comprising of the SpCell and optionally one or more Secondary Cells (SCells). An SCG may refer to a group of serving cells associated with the Secondary Node (SN), comprising of the SpCell and optionally one or more SCells.

As previously disclosed, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3GPP may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services.

Any two or more than two of the following sentences, paragraphs, (sub)-bullets, points, actions, behaviors, terms, alternatives, aspects, examples, or claims described in the following invention(s) may be combined logically, reasonably, and properly to form a specific method.

Any sentence, paragraph, (sub)-bullet, point, action, behaviors, terms, alternatives, aspects, examples, or claims described in the following invention(s) may be implemented independently and separately to form a specific method.

Dependency, such as "based on", "more specifically", "preferably", "in one embodiment", "in one alternative", "in one example", "in one aspect", "in one implementation", etc., in the present disclosure is just one possible example which would not restrict the specific method.

Examples of some selected terms are provided as follows.

User Equipment (UE): The UE may be referred to PHY/MAC/RLC/PDCP/SDAP entity. The PHY/MAC/RLC/PDCP/SDAP entity may be referred to the UE.

Network (NW): The NW may be a network node, a TRP, a cell (e.g., SpCell, PCell, PSCell, and/or SCell), an eNB, a gNB, and/or a base station (BS).

Serving Cell: A PCell, a PSCell, or an SCell. The serving cell may be an activated or a deactivated serving cell.

Special Cell (SpCell): For Dual Connectivity operation the term Special Cell refers to the PCell of the MCG or the PSCell of the SCG depending on if the MAC entity is associated with the MCG or the SCG, respectively. Otherwise the term Special Cell refers to the PCell. A Special Cell supports PUCCH transmission and contention-based Random Access, and is always activated.

CC (Component Carrier): The CC may be a PCell, PSCell, and/or SCell.

Small Data Transmission

NR supports the RRC_INACTIVE state, and UEs with infrequent (e.g., periodic and/or non-periodic) data transmission are generally maintained by the network in the RRC_INACTIVE state. Data transmission is not supported in the RRC_INACTIVE state until Release 16 (Rel-16). Hence, the UE may need to resume the connection (e.g., move to the RRC_CONNECTED state) for any DL reception and/or UL data transmission. Connection setup and subsequent release to the RRC_INACTIVE state happens for each data transmission regardless of how small and infrequent the data packets are. This may result in unnecessary power consumption and signaling overhead. A UE in the RRC_INACTIVE state may also be referred to as an RRC_INACTIVE UE in the present disclosure.

Signaling overhead from the RRC_INACTIVE state UEs due to transmission of small data packets is a general problem. As the number of UEs increases in NR, the signaling overhead may become a critical issue not only for network performance and efficiency but also for the UE battery performance. In general, any device that has intermittent small data packets in the RRC_INACTIVE state may benefit from enabling small data transmission in the RRC_INACTIVE state.

The key enablers for small data transmission in NR may include the RRC_INACTIVE state, 2-step RACH, 4-step RACH, and configured grant Type-1. Implementations in the present disclosure may build on these building blocks to enable small data transmission in the RRC_INACTIVE state for NR.

RRC_INACTIVE

According to 3GPP Technical Specification (TS) 38.300 and TS 38.331, RRC_INACTIVE is a state in which a UE remains in the CM-CONNECTED state and can move within an area configured by NG-RAN (the RNA) without notifying NG-RAN. In RRC_INACTIVE, the last serving gNB node keeps the UE context and the UE-associated NG connection with the serving AMF and UPF.

For NR connected to 5GC, the UE identity "I-RNTI" may be used to identify the UE context in RRC_INACTIVE. The I-RNTI provides a new NG-RAN node a reference to the UE context in the old NG-RAN node. How the new NG-RAN node is able to resolve the old NG-RAN ID from the I-RNTI is a matter of proper configuration in the old and new NG-RAN node.

UE Inactive AS Context

UE Inactive AS Context is stored when the connection is suspended (e.g., when the UE is in the RRC_INACTIVE state) and restored when the connection is resumed (e.g., when the UE transitions from the RRC_INACTIVE state to the RRC_CONNECTED state).

In addition, in RRC_INACTIVE, a UE-specific DRX may be configured by upper layers or by the RRC layer, UE-controlled mobility is based on network configuration, the UE stores the UE Inactive AS context, and a RAN-based notification area is configured by the RRC layer.

Furthermore, the UE may perform the following actions in the RRC_INACTIVE state:
Monitors Short Messages transmitted with P-RNTI over DCI;
Monitors a Paging channel for CN paging using 5G-S-TMSI and RAN paging using fullI-RNTI;
Performs neighboring cell measurements and cell (re)selection;
Performs RAN-based notification area updates periodically and when moving outside the configured RAN-based notification area;
Acquires system information and can send SI request (if configured);
Performs Small Data Transmission (SDT).

Random Access Procedure

Based on the 3GPP TS 38.300, two types of random access (RA) procedure are supported: 4-step RA type with Msg1 (e.g., RA preamble) and 2-step RA type with MsgA (e.g., RA preamble and/or PUSCH data). Both types of RA procedure support contention-based random access (CBRA) and contention-free random access (CFRA).

The UE selects the type of random access at initiation of the random access procedure based on network configuration:
When CFRA resources are not configured, an RSRP threshold is used by the UE to select between 2-step RA type and 4-step RA type;
When CFRA resources for 4-step RA type are configured, UE performs random access with 4-step RA type;
When CFRA resources for 2-step RA type are configured, UE performs random access with 2-step RA type.

The network does not configure CFRA resources for 4-step and 2-step RA types at the same time for a Bandwidth Part (BWP). CFRA with 2-step RA type is only supported for handover.

The MsgA of the 2-step RA type includes a preamble on a PRACH and a payload on a PUSCH. After MsgA transmission, the UE monitors for a response (e.g., MsgB) from the network within a configured window. For CFRA, upon receiving the network response, the UE ends the random access procedure. For CBRA, if contention resolution is successful upon receiving the network response, the UE ends the random access procedure; while if a fallback indication is received in MsgB, the UE performs Msg3 transmission and monitors contention resolution. If contention resolution is not successful after Msg3 (re)transmission(s), the UE goes back to MsgA transmission.

If the random access procedure with 2-step RA type is not completed after a number of MsgA transmissions, the UE can be configured to switch to CBRA with 4-step RA type.

Configured UL Grant

According to the 3GPP TS 38.300 and TS 38.321, with Configured Grants, the gNB can allocate uplink resources for the initial HARQ transmissions to UEs. Two types of configured uplink grants are defined:
With Type 1, RRC directly provides the configured uplink grant (including the periodicity).
With Type 2, RRC defines the periodicity of the configured uplink grant while a PDCCH addressed to CS-RNTI can either signal and activate the configured uplink grant, or deactivate it. In one implementation, a PDCCH addressed to CS-RNTI indicates that the uplink grant can be implicitly reused according to the periodicity defined by RRC, until deactivated.

There are three types of transmission without a dynamic grant:
Configured Grant Type 1, where an uplink grant is provided by RRC, and stored as configured uplink grant;
Configured Grant Type 2, where an uplink grant is provided by PDCCH, and stored or cleared as a configured uplink grant based on L 1 signaling indicating a configured uplink grant activation or deactivation;
Retransmissions on a stored configured uplink grant of Type 1 or Type 2 configured with cg-Retransmission Timer.

Type 1 and Type 2 are configured by RRC per Serving Cell and per BWP. Multiple configurations can be active simultaneously in the same BWP. For Type 2, activation and deactivation are independent among the Serving Cells. For the same BWP, the MAC entity can be configured with both Type 1 and Type 2.

RRC may configure the following parameters when the configured grant Type 1 is configured:

cs-RNTI: CS-RNTI for retransmission;
periodicity: periodicity of the configured grant Type 1;
timeDomainOffset: Offset of a resource with respect to SFN=timeReferenceSFN in time domain;
timeDomainAllocation: Allocation of configured uplink grant in time domain which contains startSymbolAndLength (i.e., SLIV in TS 38.214);
nrofHARQ-Processes: The number of HARQ processes for configured grant;
harq-ProcID-Offset: Offset of HARQ process for configured grant for operation with shared spectrum channel access;
harq-ProcID-Offset2: Offset of HARQ process for configured grant;
timeReferenceSFN: SFN used for determination of the offset of a resource in time domain. The UE uses the closest SFN with the indicated number preceding the reception of the configured grant configuration.

RRC may configure the following parameters when retransmissions on configured uplink grant is configured:

cg-RetransmissionTimer: The duration after a configured grant (re)transmission of a HARQ process when the UE shall not autonomously retransmit that HARQ process.

For configured uplink grants configured with cg-Retransmission Timer, the UE may select a HARQ Process ID among the HARQ process IDs available for the configured grant configuration. The UE may prioritize retransmissions before initial/new transmissions. The UE may toggle the NDI in the CG-UCI for new transmissions and not toggle the NDI in the CG-UCI in retransmissions. It should be noted that the term "initial transmission" and the term "new transmission" may be used interchangably in the present disclosure.

For configured uplink grants configured with cg-Retransmission Timer, Redundancy Version Zero is used for initial/new transmissions and UE may select the redundancy version for retransmissions.

When cg-Retransmission Timer is configured and the HARQ entity obtains a MAC PDU to transmit, the corresponding HARQ process is considered to be pending. A pending HARQ process is pending until a transmission is performed on that HARQ process or until the HARQ process is flushed.

Small Data Transmission in RRC_INACTIVE

In NR, small data transmission (SDT) in RRC_INACTIVE has been preliminarily studied. The solution for small data transmission in RRC_INACTIVE may be service-agnostic, catering different service requirements. One or more of the following characteristics for a candidate solution may be assumed in the present disclosure:

Small data transmission (procedure) can both operate with RACH-based schemes, (e.g., RA-SDT, such as SDT via 2-step and/or 4-step RACH procedure) and/or pre-configured PUSCH resources (e.g., CG-SDT, such as SDT via the configured grant Type 1).

The UE AS context (e.g., UE Inactive AS Context) used for uplink data transmission in RRC_INACTIVE should be the same as the one used in a state transition from RRC_INACTIVE to RRC_CONNECTED. The UE AS context is located and identified in the network via an "AS Context ID" allocated by the network and stored in the UE (and the network) when the UE goes to RRC_INACTIVE. The UE AS context is used to locate the AS context when the UE either tries to transmit small data and/or to perform a transition to RRC_CONNECTED. The UE AS Context can be stored in an "anchor"/source gNB and may be fetched to the new serving gNB when needed upon triggering of small data transmission and/or transition from RRC_INACTIVE to RRC_CONNECTED. A UE ID may be used to uniquely identify the UE via the UE context in the RAN.

Small data transmission may use the AS Context ID transmitted in the "first" message for contention resolution (e.g., at least when RACH is used). After the network receives the "first" message with small UL data, the network may inform the UE that it should move to RRC_CONNECTED via a DL RRC message (e.g., RRCConnectionResume). The "first" message with small UL data may provide information to enable the network to apply overload control and prioritization, if needed.

The UE provides some necessary information in the "first" message with the initial uplink data transmission to enable the network to move the UE to the RRC_CONNECTED state or to enable the network to let the UE remain in RRC_INACTIVE. For example, the CCCH message, BSR MAC CE, etc. may be included in the "first" message.

Small data transmission solution may be able to support at least RLC ARQ mechanism.

The network may perform a context update when the UE sends small data in RRC_INACTIVE. That update may rely on RRC signaling and may be done in the "second" message (e.g., RRCConnectionResume or a control response message triggered by small data transmission).

The UE context in RRC_INACTIVE may include the configuration of radio bearers, logical channels, and/or security, etc.

The UE may maintain the same PDCP entity like in RRC_CONNECTED and maintain PDCP COUNT and Sequence Number (SN) of PDCP.

Multiple DRBs (and/or SRBs) can be maintained in RRC_INACTIVE, and data transmission may take place on the DRB/SRB associated with the concerned service. For small data transmission in RRC_INACTIVE, the UE may use a currently configured DRB/SRB. If bearers with configured QoS are allowed to be used for small data transmission, the QoS may still be required to be met.

An RRC Connection Resume Request may contain at least the required information for the network to perform contention resolution, identify the UE AS context, and verify that the current UE is the correct UE. Upon receiving the response from the network (e.g., "RRC Connection Resume"), the UE may identify that the current network is the correct network, perform contention resolution, and receive DL data. The UE may either remain in RRC_INACTIVE or resume its previously suspended connection, such as moving to RRC_CONNECTED.

DL transmissions/responses and subsequent UL/DL transmissions may be supported without the UE having to transition to RRC_CONNECTED.

UE may provide information to enable the network to decide whether to leave the UE in RRC_INACTIVE or transition the UE to RRC_CONNECTED.

Configurations to Support Small Data Transmission in RRC_INACTIVE

The small data transmission (SDT) configuration may be configured via an RRC release message (and/or in the suspend configuration in the RRC release message). Alternatively, the SDT configuration(s) may be configured via an RRC reconfiguration message (e.g., via dedicated RRC signaling). For example, the UE may receive the SDT configuration via an RRC reconfiguration message from the serving cell while the UE is in RRC_CONNECTED.

The SDT configuration(s) may include at least one or multiple of the following configurations. The following configuration(s) may be applied by the UE if the UE is configured to support SDT in RRC_INACTIVE. The UE may enter the RRC_INACTIVE state upon receiving the SDT configuration(s). The SDT configuration(s) may (only) be applied when the UE is in the RRC_INACTIVE state.

- The SDT configuration may include a RACH configuration for SDT: A specific (group of) preamble(s) and/or PRACH resource(s) for small data transmission in RRC_INACTIVE may be configured. The specific preamble(s) and/or PRACH resource(s) may be associated with a specific grant size for Msg3. The UE may select the preamble and/or PRACH resource to initiate an RA procedure for small data transmission in RRC_INACTIVE based on some criteria (e.g., based on buffer status, channel quality, size of pending data, etc.).
- The SDT configuration may include a 2-step RACH configuration for SDT: A specific (group of) preamble(s), PRACH resource(s), and/or MsgA PUSCH(s) for small data transmission in RRC_INACTIVE may be configured. The UE may select the preamble, PRACH resource, and/or the associated MsgA PUSCH based on some criteria (e.g., based on buffer status, channel quality, size of pending data, etc.).
- The SDT configuration may include a configured grant (CG) configuration for SDT: The CG configuration included in the small data transmission configuration may include one or more of the parameters listed in the IE ConfiguredGrantConfig (e.g., the periodicity of the configured grant, the size of the UL resource, the duration of the UL resource, etc.) and/or other parameters (e.g., a number and/or a threshold that may be used for the release of the CG, a TA timer for SDT, an RSRP change threshold, a specific RNTI, a configured grant index, and/or a timer for the response/feedback, etc.). The timer for the response/feedback may be used by the UE to monitor PDCCH to receive the response/feedback from the NW for a UL transmission via CG resource. The configured grant configuration may be a Type 1 configured grant. The configured grant may only be used in RRC_INACTIVE and/or may be used in both RRC_CONNECTED and RRC_INACTIVE. The configured grant may be a dedicated UL resource for a UE. The UE may be configured with multiple configured grant configurations (e.g., with different CG indexes), which may be used for small data transmission in RRC_INACTIVE. In one implementation, the UE may maintain a counter. The UE may decrement the counter (such as decreasing a value of the counter by 1) after each transmission via the configured grant. If the counter reaches zero, the UE may clear/release the configured grant (configuration). A validity timer may be configured in the configured grant configuration. The validity timer may be used to reflect whether the configured grant is valid or not. For example, the configured grant may only be considered valid while the timer is running
- The SDT configuration may include a configuration for response/feedback: After the UE performs a transmission (which may be an initial/new transmission and/or a retransmission) for data (e.g., a TB), the UE may need to receive a response/feedback (which may be referred to as an L1-based ACK/NACK (e.g., the response/feedback is indicated by the PHY signaling), L2-based ACK/NACK (e.g., the response/feedback is indicated by the MAC or RLC signaling), and/or L3-based ACK/NACK (e.g., the response/feedback is indicated by the RRC signaling) from the NW to indicate whether the data has been successfully received by the NW. The small data transmission configuration may include the corresponding configurations, including a specific RNTI for monitoring the response/feedback, the PDCCH monitoring occasion (e.g., search space and/or CORESET), an offset, and/or a timer for monitoring the response/feedback, etc. The specific RNTI may be one or more of the I-RNTI, P-RNTI, PUR-RNTI, CS-RNTI, C-RNTI, fullI-RNTI, shortI-RNTI, etc. The timer for monitoring the response/feedback may be included in the CG configuration for SDT. The configuration for response/feedback may be included in the CG configuration for SDT.
- The SDT configuration may include a Radio Bearer (RB) configuration for SDT: An RB list including one or more specific SRBs and/or DRBs may be configured for small data transmission. For example, the specific SRBs and/or DRBs for SDT may be resumed when the UE initiates an SDT procedure.
- The SDT configuration may include a BWP indicator: A specific BWP (ID) may be configured for the UE to use in RRC_INACTIVE (e.g., for small data transmission). For example, the UE may switch its active BWP to the specific BWP when entering RRC_INACTIVE or when initiating SDT (e.g., with CG). The UE may perform small transmission (e.g., via CG for SDT) on the specific BWP. The specific BWP may be an initial BWP, a default BWP, a BWP for SDT, and/or a specific BWP which was used as an active BWP when the UE was in RRC_CONNECTED before entering RRC_INACTIVE. The BWP indicator may be included in the CG configuration for SDT.
- The SDT configuration may include a UE ID: The UE ID may be UE AS context ID, UE inactive AS context, etc. The UE ID may be transmitted together with the initial data transmission for SDT. For example, the UE ID may be transmitted via Msg1, Msg 3, MsgA, and/or the initial UL resource derived from the configured grant. The UE ID may be used for monitoring the response/feedback from the NW.
- The SDT configuration may include a specific RNTI: The specific RNTI may be one or more of the C-RNTI, CS-RNTI, I-RNTI, fullI-RNTI, shortI-RNTI, a specific RNTI for SDT, etc. The specific RNTI may be used for monitoring the response/feedback from the NW. The specific RNTI may be included in the CG configuration for SDT
- The SDT configuration may include a Time Alignment (TA) configuration: A TA timer for SDT may be configured for the UE. For example, when the UE receives a Timing Advance command, the UE may apply the Timing Advance command and/or (re)start the TA timer for SDT. The Timing Advance command may be used to update the TA value for UL synchronization. While the TA timer for SDT is running, the UE may consider the TA valid. If the TA timer for SDT expires or is not running, the UE may consider the TA invalid. The UE may only use the configured grant for small data transmission in RRC_INACTIVE if the TA is considered valid. Otherwise, the UE may initiate an RRC connection resume procedure and/or a random access procedure if the TA is considered invalid (e.g., when the TA timer for SDT expires.). The UE may (re)start the TA timer when receiving a response/feedback, e.g., L1/L2/L3-based ACK/NACK. The UE may (re)start the TA timer when receiving a response/feedback if the response/feedback indicates information for TA update. The TA configuration for SDT may be included in the CG configuration for SDT.

In some implementations, when a UE receives the small data transmission configuration(s) in the RRC_CONNECTED state, the UE may switch to the RRC_INACTIVE state. The UE may apply the small data transmission configuration and/or perform an SDT procedure while the UE is in the RRC_INACTIVE state. The UE may perform UL and/or DL data transmission during the SDT procedure according to the small data transmission configuration(s). The UE may resume some SRBs and/or DRBs for SDT when initiating the SDT procedure.

FIG. 1 illustrates a process 100 of SDT via CG according to an example implementation of the present disclosure. The UE 102 may be configured with a CG configuration for SDT (e.g., configured by the small data transmission configuration) from the NW 101. The CG configuration may indicate UL resources with periodicity 108, including CG resource #1 121, CG resource #2 122, CG resource #3 123, and CG resource #4 124. The UE may be scheduled, by the NW 101, with a dynamic UL grant (DG) for a UL resource via PUSCH 130. The UE 102 performs an initial/new transmission 103 via CG resource #1 121. The UE may use the periodic CG resources to perform small data transmission(s) in the RRC_INACTIVE state. The UE may (re)start a response timer 110 after initiating the initial/new transmission 103. The response timer may be (re)started after an offset 109 after initiating the initial/new transmission 103. The UE may monitor the PDCCH 140 while the response timer 110 is running To increase the reliability of small data transmission in RRC_INACTIVE, the mechanism for retransmission may be supported. For retransmission, the UE 102 may receive the response/feedback (e.g., ACK/NACK) from the NW 101 to check whether the previous UL transmission is successful or not. In one implementation, the NW 101 may transmit the feedback via PHY signaling 104. In one implementation, the NW 101 may transmit the feedback via MAC/RLC/RRC signaling 105.

In one implementation, the NW 101 may indicate the feedback via PHY signaling 104 (which may be referred to as L1-based ACK/NACK). The feedback via PHY signaling 104 may be Downlink Feedback Information (DFI). The feedback via PHY signaling 104 may be transmitted via PDCCH 140. In one implementation, the NW 101 may explicitly indicate the ACK/NACK via the DFI (e.g., via a bit field to include the ACK/NACK information). In one implementation, the NW 101 may implicitly indicate the feedback via the PHY signaling 104. For example, if the UE successfully receives the PHY signaling 104 (addressed to a specific RNTI disclosed in the present disclosure) within a specific duration (e.g., when a response timer 110 is running), the UE may consider the PHY signaling 104 as an ACK, which means the UE may consider the previous UL transmission as successful. If the UE does not successfully receive the PHY signaling 104 (e.g., via the specific RNTI) within the specific duration (e.g., when the response timer 110 is running), the UE may consider the PHY signaling 104 as NACK, which means the UE may consider the previous UL transmission as unsuccessful. In one implementation, the response timer 110 may be started at an offset 109 after the (end of) an initial/new transmission and/or retransmission (e.g., via a CG resource).

In one implementation, the NW 101 may indicate the feedback via MAC/RLC/RRC signaling 105 (which may be referred to as L2/L3-based ACK/NACK in the present disclosure), such as an RLC (control PDU), a MAC CE, and/or an RRC message. The MAC/RLC/RRC signaling 105 may be transmitted on a PDSCH 150. To transmit the MAC/RLC/RRC signaling 105, the NW 101 may first transmit scheduling information via DCI (on PDCCH) (e.g., addressed to a specific RNTI disclosed in the present disclosure), then the DCI may indicate to the UE 102 to receive the MAC/RLC/RRC signaling 105 (on the PDSCH 150).

The feedback via PHY signaling 104 and/or the feedback via MAC/RLC/RRC signaling 105 may indicate the information of HARQ process(es) (e.g., with HARQ process ID), a CG index(es), a sequence number for ACK/NACK, ACK/NACK information, scheduling information for retransmission (e.g., a time/frequency resource for retransmission), indication for TA update, indication for releasing the CG resource/configuration, indication for initiating an RA procedure, indication for triggering BSR, etc.

The feedback via PHY signaling 104 and the feedback via MAC/RLC/RRC signaling 105 may be applied concurrently. For example, the feedback via PHY signaling 104 may be used for confirming whether the data (e.g., TB) in the HARQ buffer has been successfully transmitted or not, and the feedback via MAC/RLC/RRC signaling 105 may be used for confirming whether the data (e.g., TB, RLC SDU, or PDCP SDU) in the L2 (e.g., RLC or PDCP) or L3 buffer has been successfully transmitted or not.

Based on the feedback from the NW 101, the UE 102 may perform the retransmission when the UE 102 receives the feedback with "NACK" information and/or when the UE 102 does not receive feedback with "ACK" information from the NW 101 (e.g., the UE 102 does not receive the "ACK" information from the NW 101 within the time duration). Retransmissions may be performed on the resource and, if provided, with the MCS indicated on PDCCH, or on the same resource and with the same MCS as was used for the last transmission attempt within a bundle, or on stored configured uplink grant resources and stored MCS when cg-Retransmission Timer is configured. In one implementation, the UE 102 may perform the retransmission via configured grant 106, which may also be referred to as a UL resource configured by the CG configuration. In one implementation, the UE 102 may perform the retransmission via dynamic grant 107, which may also be referred to as a UL grant scheduled by the NW 101.

In some implementations, for retransmission via configured grant 106, the UE 102 may (re)start a response timer 112 and/or monitor PDCCH (e.g., addressed to a specific RNTI on a specific search space) to receive a response/feedback from the NW 101 while the response timer 112 is running. The response timer 112 may be (re)started at an offset 111 after (the end of) the retransmission via CG resource #3 123. For retransmission via dynamic grant 107, the UE 102 may (re)start a response timer 114 and/or monitor PDCCH (e.g., addressed to a specific RNTI on a specific search space) to receive a response/feedback from the NW 101 while a response timer 114 is running. The response timer 114 may be started or restarted at an offset 113 after (the end of) the retransmission via a PUSCH resource 130.

In some implementations, for the initial/new transmission 103 via the configured grant resource #1 121, the UE 102 may (re)start a response timer 110 and/or monitor PDCCH (e.g., addressed to a specific RNTI on a specific search space) to receive a response/feedback from the NW 101 while the response timer 110 is running. The response timer 110 may be started or restarted at an offset 109 after (the end of) the initial/new transmission 103 via CG resource #1 121.

Figure 2:
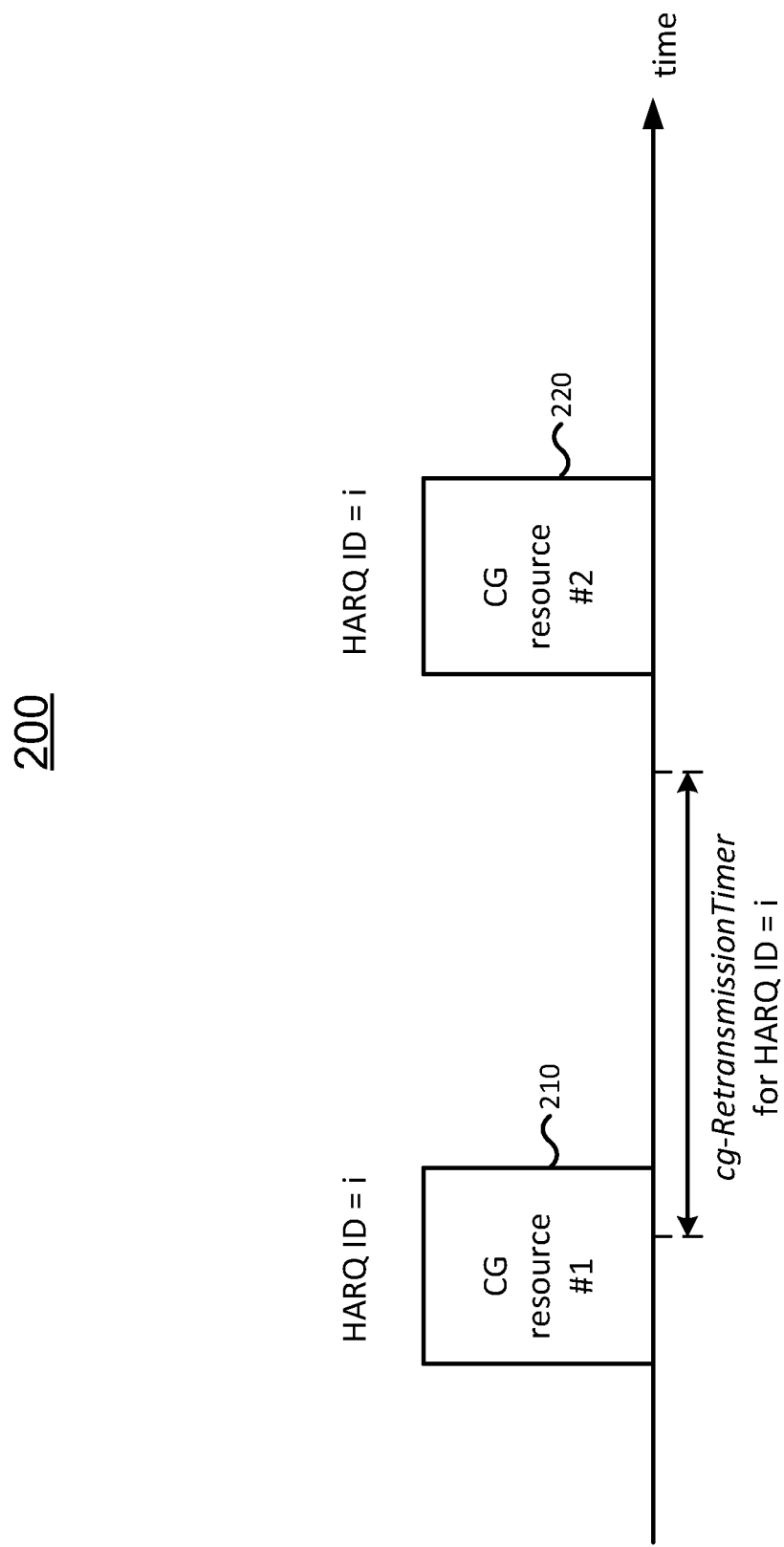
FIG. 2 illustrates a process of autonomous retransmission via CG resource, according to an example implementation of the present disclosure.

To increase retransmission flexibility, a new timer (e.g., cg-RetransmissionTimer) may be introduced. The UE can perform retransmission for a CG resource on another CG resource with the same HARQ process ID and TBS if cg-RetransmissionTimer for the corresponding HARQ process is not running and/or the NW has not provided a DG for retransmission for the corresponding HARQ process. FIG. 2 illustrates a process 200 of autonomous retransmission via CG resource according to an example implementation of the present disclosure. The UE performs UL transmission via CG resource #1 210 associated with a HARQ process ID #i, where i is an integer. A CG retransmission timer (e.g., cg-RetransmissionTimer) may be (re)started after (the end of) the CG resource #1. The UE cannot use the HARQ process ID #i for retransmission while the CG retransmission timer is running. After the CG retransmission timer expires, the UE can perform retransmission of the CG resource #1 via CG resource #2 220, which is also associated with the HARQ process ID #i. In this sense, expiration of cg-Retransmission Timer for a HARQ process may imply "NACK" of a corresponding CG transmission. When cg-Retransmission Timer is configured and the HARQ entity obtains a MAC PDU to transmit, the corresponding HARQ process may be considered pending. A pending HARQ process is pending until a transmission is performed on that HARQ process or until the HARQ process/buffer is flushed.

After the UE performs a UL transmission (which may be a new/initial transmission and/or retransmission) for small data, the UE may need to monitor PDCCH (e.g., addressed to a specific RNTI on a specific search space) to receive a response/feedback from the NW. The response/feedback may indicate whether the UL transmission has been successfully received by the NW. With the feedback for the UL transmission, the UE may determine whether to perform the retransmission accordingly. The UE may monitor PDCCH to receive the feedback. However, when the UE is in the RRC_INACTIVE state, the UE may apply a DRX mechanism to reduce power consumption, whereby the UE may only monitor PDCCH on some PDCCH monitoring occasion (e.g., on one paging occasion (on the paging search space) per DRX cycle).

Apart from that, there may be no other opportunity for the UE to monitor the PDCCH (for receiving the feedback). Consequently, more PDCCH monitoring occasions may be used for the UE to monitor the potential feedback(s) for small data transmission when the UE is in the RRC_INACTIVE state.

PDCCH Monitoring Occasion

In one implementation, a UE may be configured with a PDCCH monitoring occasion for monitoring the response/feedback (e.g., based on a specific search space and/or CORESET). When the UE is configured with a specific search space and/or CORESET, the UE may monitor the specific search space and/or CORESET to detect DCI scramble by a specific RNTI. After the UE performs an initial/new transmission or retransmission (e.g., via CG resource) in the RRC_INACTIVE state, the UE may need to monitor PDCCH on the specific search space and/or CORESET. If the UE does not perform an initial/new transmission or retransmission (e.g., via CG resource) in the RRC_INACTIVE state, the UE may not be required to monitor PDCCH on the specific search space and/or CORESET. The PDCCH monitoring occasion for monitoring the feedback may be configured as an offset (the offset may be zero or non-zero, e.g., an integer value) after one or multiple CG resources (and/or its transmission occasions). The PDCCH monitoring occasion for monitoring the feedback may be configured with a periodicity. The periodicity may be associated with the periodicity of the CG resource/configuration. The specific search space and/or CORESET may be configured in the CG configuration for SDT. The specific search space and/or CORESET may be configured in the small data transmission configuration.

In some implementations, the feedback and/or a specific UL grant via PDCCH and/or DCI may be associated with the previous transmission via a CG resource. In one implementation, a DCI (e.g., DFI field) indicates the feedback for the previous transmission via a CG resource. In one implementation, a DCI may indicate a specific UL grant for a new transmission associated with a HARQ process used for the previous transmission via a CG resource. In one implementation, the DCI may indicate one or more HARQ process ID(s) for the feedback and/or the specific UL grant.

Timer-Based PDCCH Monitoring

Figure 3:
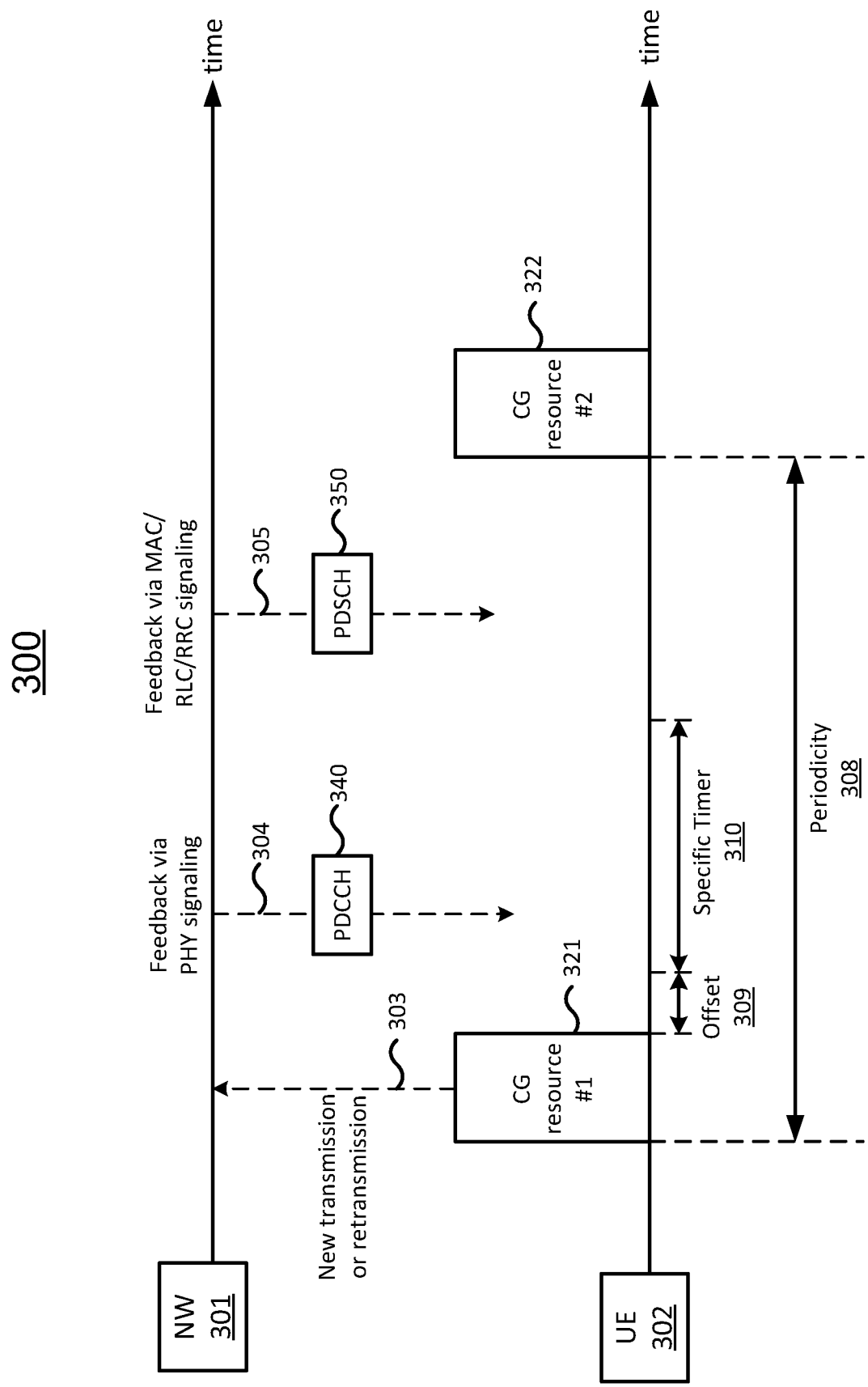
FIG. 3 illustrates a process of timer-based PDCCH monitoring, according to an example implementation of the present disclosure.

FIG. 3 illustrates a process of timer-based PDCCH monitoring according to an example implementation of the present disclosure. The UE 302 may be configured with a CG configuration for SDT (e.g., configured by the small data transmission configuration) from the NW 301. The CG configuration may indicate UL resources with periodicity 308, including CG resource #1 321 and CG resource #2 322. The UE 302 performs an initial/new transmission or a retransmission 303 via CG resource #1 321. A specific timer 310 (e.g., a response timer or response window) may be used for monitoring the PDCCH to receive the response/feedback from the NW 301 for a previous UL transmission. In one implementation, the NW 301 may transmit the response/feedback via PHY signaling 304, which may be transmitted on a PDCCH 340. In one implementation, the NW 301 may transmit the response/feedback via MAC/RLC/RRC signaling 305, which may be transmitted on a PDSCH 350.

For example, the UE 302 may monitor PDCCH 340 (e.g., addressed to a specific RNTI on a specific search space) while the specific timer 310 is running to receive the response/feedback. The UE 302 may stop monitoring the PDCCH 340 (e.g., addressed to a specific RNTI on a specific search space) while the specific timer 310 is not running. The (value of) specific timer 310 may be configured in the small data transmission configuration. The (value of) specific timer 310 may be configured in the CG configuration which may be included in the small data transmission configuration. The specific timer 310 may be modelled as a time window. In one implementation, the specific timer 310 may be drx-RetransmissionTimerDL and/or drx-RetransmissionTimerUL. In one implementation, the specific timer 310 may be configuredGrantTimer.

While the specific timer 310 is running, the UE 302 may perform one or more of the following actions:

While the specific timer 310 is running, the UE 302 may keep monitoring the PDCCH 340.

While the specific timer 310 is running, the UE 302 may monitor the PDCCH 340 (for a response/feedback) addressed to the specific RNTI (e.g., used for SDT and/or used for CG for SDT).

While the specific timer 310 is running, the UE 302 may keep monitoring the PDCCH 340 on the specific search space/CORESET disclosed in the present disclosure.

While the specific timer 310 is running, the UE 302 may not perform (UL/DL) initial/new transmission and/or retransmission (e.g., via CG).

While the specific timer 310 is running, the UE 302 may only consider the NDI bit for the corresponding HARQ process to have been toggled and deliver the configured uplink grant and the associated HARQ information to the HARQ entity when the specific timer 310 (for the HARQ process) is not running While the specific timer 310 is running, the UE 302 may or may not initiate, perform, and/or trigger a procedure (e.g., SR procedure, BSR procedure, RA procedure, RRC connection establishment, RRC connection re-establishment, RRC connection resume procedure, cell (re)selection, RNA update (e.g., timer T380 expires or triggered upon reception of SIB1), tracking area update, etc.).

While the specific timer 310 is running, the UE 302 may or may not perform measurement (e.g., RRM measurement). While the specific timer 310 is running, the UE 302 may or may not measure a reference signal (e.g., SSB and/or CSI-RS). The RRM measurements in Idle/Inactive mode, to support Idle mode mobility (e.g., cell selection/re-selection), include both RSRP and RSRQ measurements, which the UE 302 may support. The RRM measurements in NR in Idle/Inactive mode may be SSB-based. The UE 302 may perform neighbor cell beam measurements according to the SMTC window and ssb-ToMeasure in SIB2/SIB4 and serving cell beam measurements according to ssb-PositionsInBurst and ssb-PeriodicityServingCell in SIB1.

While the specific timer 310 is running, the UE 302 may or may not release/clear/suspend the corresponding CG resource/configuration.

While the specific timer 310 is running, the UE 302 may or may not monitor the PDCCH 340 for short message and/or paging.

While the specific timer 310 is running, the UE 302 may or may not monitor the PDCCH 340 on the paging search space.

The specific timer 310 may be (re)started when one or more of the following conditions is satisfied:

The specific timer 310 may be (re)started when the UE 302 performs an initial/new transmission and/or retransmission for UL/DL. The initial/new transmission and/or retransmission for UL/DL may be transmitted by a CG (e.g., via CG resource for SDT) and/or a DG (e.g., scheduled by a BS).

The specific timer 310 may be (re)started an offset 309 after the UE performs a new transmission or retransmission for UL/DL. The offset 309 may be a fixed value and/or a configured value. The offset 309 may be configured by the NW (e.g., via the small data transmission configuration(s)). The offset may be controlled by an RTT timer (e.g., HARQ RTT timer). For example, when the UE 302 performs an initial/new transmission or retransmission for UL/DL, the UE may (re)start the RTT timer. While the RTT timer is running, the UE 302 may or may not monitor the PDCCH 340 for the feedback (e.g., on PDCCH monitoring occasion disclosed previously). When the RTT timer expires, the UE 302 may (re)start the specific timer 310. The RTT timer may be (re)started in the first symbol after the end of the corresponding transmission carrying the DL HARQ feedback. The RTT timer may be (re)started in the first symbol after the end of the first repetition of the corresponding PUSCH transmission. In one implementation, the RTT timer may be drx-HARQ-RTT-TimerDL and/or drx-HARQ-RTT-UL, as specified in the 3GPP TS 38.321.

The specific timer 310 may (only) be (re)started when TA or CG is considered valid (e.g., when a TA timer is running) The specific timer 310 may not be (re)started when TA or CG is considered invalid (e.g., when the TA timer is not running or a CG configuration is released).

The specific timer 310 may be stopped when one or more of the following conditions is satisfied:

The specific timer 310 may be stopped when the UE 302 successfully monitors/receives a response/feedback from the NW (e.g., while the specific timer 310 is running) The UE 302 may (only) stop the specific timer 310 when the response/feedback indicates ACK. The UE 302 may (only) stop the specific timer 310 when the response/feedback indicates NACK. The UE 302 may (only) stop the specific timer 310 when the response/feedback indicates/schedules a UL resource (e.g., for retransmission). In one implementation, the UE 302 may (only) stop the specific timer 310 when the response/feedback indicates/schedules a specific UL grant for a new transmission associated with a HARQ process used for the transmission.

The specific timer 310 may be stopped when the UE 302 monitors/receives a short message indicator, a short message, and/or a paging message (and the short message indicator/short message/paging indicator/paging message may indicate the feedback information). For example, upon the UE 302 receiving the paging message, the UE 302 may determine if the ue-Identity included in the PagingRecord matches the UE identity allocated by upper layers, and/or determine if the ue-Identity included in the PagingRecord matches the UE's stored fullI-RNTI. If yes, the UE 302 may stop the specific timer 310, initiate the RRC connection resumption procedure, forward the ue-Identity to upper layers and access Type (if present) to the upper layers and/or perform the actions upon entering RRC_IDLE with release cause 'other'.

The specific timer 310 may be stopped when the UE 302 initiates, performs, and/or triggers a specific procedure, e.g., SR procedure, BSR procedure, RA procedure, RRC connection establishment, RRC connection re-establishment, RRC connection resume procedure, cell (re)selection, RNA update (e.g., timer T380 expires or triggered upon reception of SIB1), tracking area update, etc.

The specific timer 310 may be stopped when the UE 302 releases/clears/suspends the corresponding CG resource/configuration. The UE 302 may release/clear/suspend the corresponding CG resource/configuration upon receiving an indication from NW 301. The UE 302 may release/clear/suspend the corresponding CG resource/configuration based on some criteria (e.g., based on a validity timer for CG, TA timer, CG/TA validity, channel condition, based on a failure counter, upon leaving a cell, upon camping on a cell, RRC state change, reception of an indication indicating that one or multiple CGs are not supported, etc.).

The specific timer 310 may be stopped when the UE 302 receives an indication from the NW 301 which indicates that the CG resource/configuration is released. The specific timer 310 may be stopped when the UE 302 receives an indication from the NW 301 which indicates that the SDT procedure is stopped/terminated.

The specific timer 310 may be stopped when the UE 302 receives an RRC signaling (e.g., RRC release message, RRC reconfiguration message, and/or system information, etc.). The UE may receive an RRC signaling indicating the modification of parameters related to one or multiple CG configuration(s). The RRC signaling (e.g., RRC release message) may be used to stop/terminate the SDT procedure.

The specific timer 310 may be stopped when a TA is considered invalid. A TA timer may be used by the UE to determine whether the TA is valid. For example, the UE may consider the TA valid while the TA timer is running. The UE may consider the TA invalid when the TA timer expires or is not running In one implementation, the UE may consider whether the TA is valid or not based on the change of RSRP (e.g., according to a RSRP threshold).

When the specific timer 310 expires, the UE 302 may perform one or more of the following actions:

When the specific timer 310 expires, the UE 302 may consider the previous transmission successful (e.g., ACK) or unsuccessful (e.g., NACK).

When the specific timer 310 expires, the UE 302 may flush the HARQ buffer used for the previous transmission.

When the specific timer 310 expires, the UE 302 may perform the retransmission via the CG autonomously. The UE 302 may perform the retransmission for a HARQ process used for the previous transmission based on the same CG configuration.

When the specific timer 310 expires, the UE 302 may start, restart, and/or stop a CG retransmission timer and/or a CG timer. The CG retransmission timer may be used for CG autonomous (re)transmission.

When the specific timer 310 expires, the UE 302 may send an indication (e.g., a request) to the NW 301 (e.g., to ask the NW 301 scheduling an UL grant (for retransmission) and/or to report the buffer status). The indication may further include information of HARQ process(es), CG index(es), offset, buffer status report, UE assistance information, etc.

When the specific timer 310 expires, the UE 302 may trigger/initiate SR, RA, and/or BSR procedure. In one implementation, the UE 302 may initiate an RA procedure when the specific timer 310 expires.

When the specific timer 310 expires, the UE 302 may increment the value of a specific counter. The UE 302 may maintain the specific counter to count the number of times of failure transmission or successful transmission. The specific counter may be maintained per UE, per MAC entity, per HARQ process, per CG, and/or per PDU/data. When the value of the specific counter reaches a maximum value, the UE 302 may trigger/initiate SR, RA, and/or BSR procedure. When the value of the specific counter reaches to a maximum value, the UE 302 may stay in the RRC_INACTIVE state and/or enter the RRC_IDLE state. When the value of the specific counter reaches to a maximum value, the UE may perform a specific procedure, e.g., RRC connection establishment, RRC connection re-establishment, RRC connection resume procedure, cell (re)selection, RNA update (e.g., timer T380 expires or triggered upon reception of SIB1), tracking area update, etc. The value of the specific counter may be configured by NW 301 (e.g., via the small data transmission configuration(s)).

In one implementation, the specific timer 310 may be configured/operated per UE, per MAC entity, per CG configuration, per HARQ process, and/or per PDU. For example, the UE 302 may be configured with multiple CG configurations (with different indexes, time/frequency resources, and/or periodicities, etc.). The specific timer 310 may only be used/operated for the associated CG configuration. For another example, the UE 302 may be configured with multiple HARQ processes for CG transmission in RRC_INACTIVE. The specific timer 310 for a HARQ process may be operated when a UL transmission is transmitted via the HARQ process.

In one example, the UE 302 may not perform an initial/new transmission via a HARQ process while the specific timer 310 for the HARQ process is running In one example, the UE 302 may not perform an initial/new transmission via a CG configuration while the specific timer 310 for the CG configuration is running In one example, the UE 302 may (only) stop the specific timer 310 for a HARQ process when the response/feedback (e.g., ACK or NACK) indicates information (e.g., an index) of the HARQ process. In one example, the UE 302 may (only) stop the specific timer 310 for a HARQ process when the feedback for the HARQ process is received, wherein the feedback may indicate a specific UL grant for a new transmission associated with the HARQ process. In one example, the specific timer for a CG configuration and/or a HARQ process may be stopped when the UE performs an initial/new transmission and/or retransmission via the CG of the CG configuration and/or via the HARQ process.

In one example, the specific timer 310 for a HARQ process may be (re)started when the UE 302 performs an initial/new transmission or retransmission via the HARQ process. In one example, the specific timer for a CG configuration may be (re)started when the UE performs an initial/new transmission or retransmission via the CG resource configured by the CG configuration.

In one example, when the specific timer 310 for a HARQ process expires, the UE 302 may consider the transmission for the HARQ process successful (e.g., ACK) or unsuccessful (e.g., NACK). In one example, when the specific timer 310 for a HARQ process expires, the UE 302 may flush the HARQ buffer used for the transmission. In one example, when the specific timer 310 for a CG configuration expires, the UE 302 may perform the retransmission via the CG resource configured by the CG configuration autonomously. In one example, when the specific timer 310 for a HARQ process expires, the UE 302 may perform the retransmission for the HARQ process (e.g., via a CG resource) autonomously. In one example, when the specific timer 310 for a HARQ process expires, the UE 302 may stop the RTT timer of the HARQ process (the details of the RTT timer are disclosed previously).

In the present disclosure, to operate the timer may be to start, restart, or stop the timer.

In the present disclosure, the unit of the timer, the specific timer, the TA timer, and the validity timer may be a symbol, slot, subframe, system frame, milli-second, second, DRX cycle, periodicity of CG, etc.

In one implementation, the specific timers may be used to control the UE action on monitoring of the PDCCH addressed to a specific RNTI. While the timer is running, the UE (in RRC_INACTIVE state) may continuously monitor the PDCCH addressed to the specific RNTI. Moreover, the timer may be (re)started at (a start time of) each PDCCH monitoring cycle and/or each time a UE detects a PDCCH addressed to the specific RNTI. While the timer is not running, the UE may not monitor the PDCCH addressed to the specific RNTI. Moreover, while the timer is not running, the UE may still monitor the PDCCH that is not addressed to the specific RNTI (e.g., the UE may still monitor the PDCCH scrambled with P-RNTI/I-RNTI).

In one implementation, the specific timer 310 may be a drx-InactivityTimer, drx-ShortCycleTimer, drx-onDurationTimer, etc.

In 3GPP, two CG-related timers were introduced: configuredGrantTimer and cg-RetransmissionTimer. The UE behaviors for the CG-related timers and the corresponding functionalities are depicted in Table 1. The details of the CG-related timers may be found in the 3GPP TS 38.321. One or both of the CG-related timers may be used/applied for small data transmission.

receiving the feedback). While the configuredGrantTimer is running, the UE may monitor the PDCCH on a specific search space/CORESET. While the configuredGrantTimer is running, the UE may monitor the PDCCH addressed to a specific RNTI. The definitions of the specific search space/CORESET, and/or the specific RNTI are disclosed previously.

In one example, when the UE receives an RRC release message (e.g., with suspend configuration), the UE may stop (all) the configuredGrantTimer. The RRC release message may include the information of the small data transmission configuration(s). The RRC release message and/or the small data transmission configuration may include the CG configuration for SDT.

In one example, the configuredGrantTimer (for a HARQ process) may be (re)started (e.g., at an offset) after an initial/new transmission or retransmission via the HARQ process and via a CG resource is performed when the UE is in RRC_INACTIVE.

In one example, the configuredGrantTimer (for a HARQ process) may be stopped when receiving the response/feedback (for the HARQ process).

In one example, (all) the configuredGrantTimer may be stopped when the UE monitors/receives a short message indicator, a short message, and/or a paging message. For example, upon the UE receiving the paging message, the UE may determine if the ue-Identity

TABLE 1

| configuredGrantTimer (performed per HARQ process) | cg-RetransmissionTimer (performed per HARQ process) |
|---|---|
| Start or restart the configuredGrantTimer when: an initial/new transmission or retransmission via a HARQ process of CG/DG is performed, and the HARQ process is configured for CG Stop the configuredGrantTimer when CG type 2 activation ACK is received for that HARQ process While the configuredGrantTimer is running: The UE could not use the corresponding HARQ process for CG initial/new transmission | Start or restart the cg-RetransmissionTimer when: an initial/new transmission or retransmission of CG via a HARQ process is performed, and the HARQ process is configured for CG Stop the cg-RetransmissionTimer when an initial/new transmission of DG via a HARQ process is performed, and the HARQ process is configured for CG ACK or NACK is received for that HARQ process configuredGrantTimer expires for that HARQ process CG type 2 activation While the cg-RetransmissionTimer is running: The UE could not use the corresponding HARQ process for CG autonomously retransmission |

On top of the legacy UE behaviors and/or functionalities for the configuredGrantTimer and cg-RetransmissionTimer, some further UE behaviors and/or functionalities may be introduced. The UE behaviors and/or functionalities disclosed below may be applied when the UE performs the small data transmission (via CG) in RRC_INACTIVE.

UE behaviors and/or functionalities for configuredGrantTimer:

The specific timer disclosed previously (i.e., for Timer-based monitoring) may be referred to as configuredGrantTimer. For example, the UE behavior(s) for the specific timer may be the UE behavior(s) for the configuredGrantTimer. The one or more criteria to start, restart, and/or stop the specific timer may be the one or more criteria to start, restart, and/or stop the configuredGrantTimer.

In one example, while (one of) the configuredGrantTimer is running, the UE may monitor the PDCCH (e.g., for included in the PagingRecord matches the UE identity allocated by upper layers, and/or determine if the ue-Identity included in the PagingRecord matches the UE's stored fullI-RNTI. If yes, the UE may stop the configuredGrantTimer timer, initiate the RRC connection resumption procedure, forward the ue-Identity to upper layers and accessType (if present) to the upper layers, and/or perform the actions upon going to RRC_IDLE with release cause 'other'.

In one example, the configuredGrantTimer may be stopped when the UE releases/clears/suspends the corresponding CG resource/configuration.

In one example, (all) the configuredGrantTimer may be stopped when the UE initiates, performs, and/or triggers a procedure, e.g., SR procedure, BSR procedure, RA procedure, RRC connection establishment, RRC connection re-establishment, RRC connection resume procedure, cell (re)selection, RNA update (e.g., timer T380 expires or triggered upon reception of SIB1), tracking area update, and/or etc.

In one example, when the configuredGrantTimer for a HARQ process expires, the UE may flush the HARQ buffer of the HARQ process.

The value of the configuredGrantTimer may be configured via the small data transmission configuration.

UE behaviors and/or functionalities for cg-RetransmissionTimer:

The specific timer disclosed previously (i.e., for Timer-based monitoring) may be referred to cg-Retransmission Timer. For example, the UE behavior(s) for the specific timer may be the UE behavior(s) for the cg-RetransmissionTimer. The one or more criteria to start, restart, and/or stop the specific timer may be the same as the one or more criteria to start, restart, and/or stop the cg-RetransmissionTimer.

In one example, when the UE receives an RRC release message (e.g., with suspend configuration), the UE may stop (all) the cg-Retransmission Timer. The RRC release message may include the small data transmission configuration. The RRC release message and/or the small data transmission configuration may include the CG configuration for SDT.

In one example, the cg-Retransmission Timer (for a HARQ process) may be stopped when receiving the response/feedback (for the HARQ process).

The value of the cg-Retransmission Timer may be configured via the small data transmission configuration.

Figure 4:
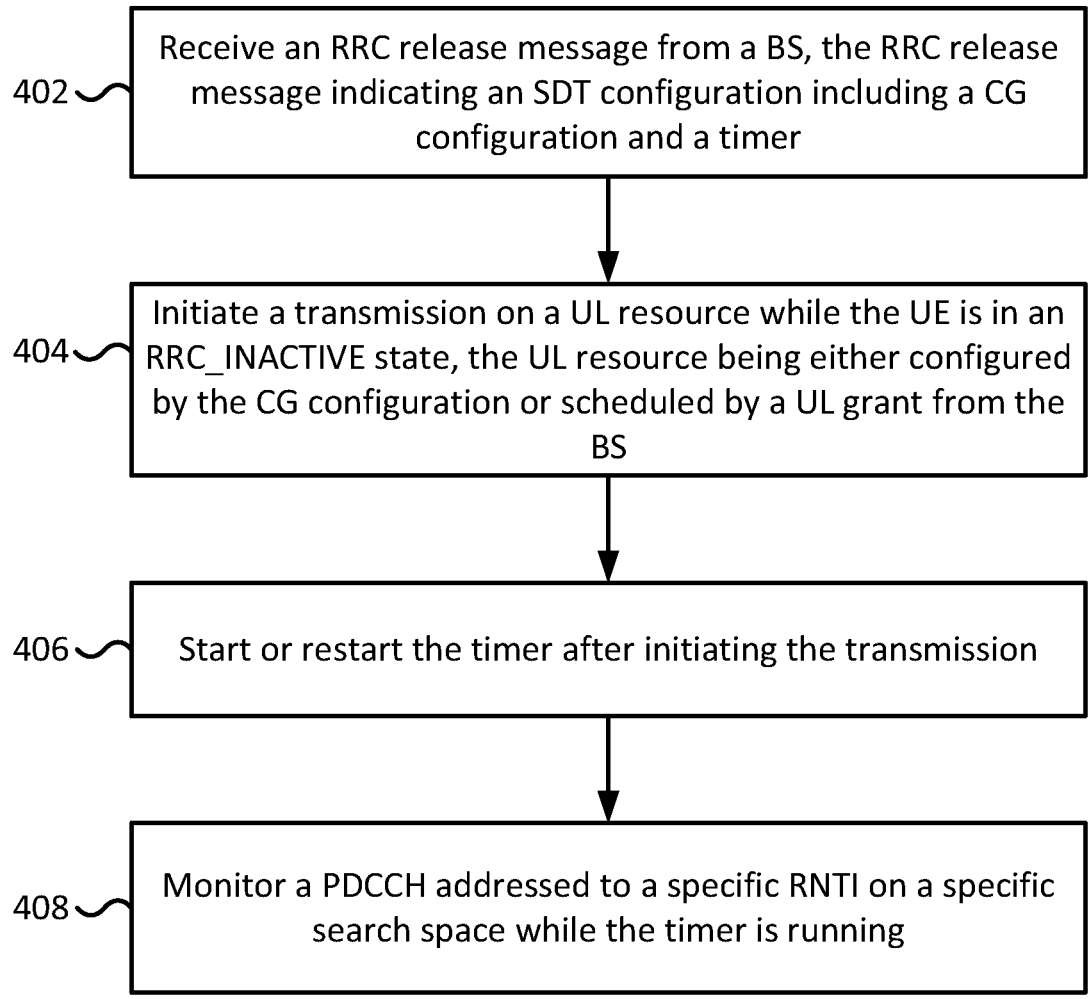
FIG. 4 illustrates a method for SDT performed by a UE, according to an example implementation of the present disclosure.

FIG. 4 illustrates a method 400 for small data transmission (SDT) performed by a UE according to an example implementation of the present disclosure. In action 402, the UE may receive an RRC release message from a BS, the RRC release message indicating an SDT configuration including a CG configuration and a timer. In one implementation, the timer may be included in the CG configuration. The RRC release message may include a suspend configuration and may instruct the UE to switch to the RRC_INACTIVE state. For example, the UE may receive the RRC release message in the RRC_CONNECTED state and then switch to the RRC_INACTIVE state upon receiving the RRC release message (which may include the suspend configuration). The SDT configuration may be included in the suspend configuration of the RRC release message. In one implementation, the UE may perform small data transmission in the RRC_INACTIVE state based on the CG configuration included in the SDT configuration which is indicated by the RRC release message. For example, the UE may perform UL data transmission on the configured CG resources (such as CG resource #1 121—CG resource #4 124 illustrated in FIG. 1) while in the RRC_INACTIVE state.

In action 404, the UE may initiate a transmission on a UL resource while the UE is in an RRC_INACTIVE state, the UL resource being either configured by the CG configuration or scheduled by a UL grant from the BS (e.g., the UL grant may be a dynamic grant). The UL resource configured by the CG configuration may refer to CG resource #1 121—CG resource #4 124 illustrated in FIG. 1. The UL resource scheduled by the UL grant may refer to PUSCH 130 illustrated in FIG. 1. The transmission may be a new transmission (e.g., new transmission 103 in FIG. 1) or a retransmission (e.g., retransmission via CG 106, retransmission via DG 107).

In action 406, the UE may start or restart the timer after initiating the transmission. The timer may refer to the response timer 110, 112, and/or 114 illustrated in FIG. 1. For example, the UE may start or restart the response timer 110 at an offset 109 after (the end of) the initial/new transmission 103 via CG resource #1 121. For example, the UE may start or restart the response timer 112 at an offset 111 after (the end of) the retransmission 106 via CG resource #3 123.

In action 408, the UE may monitor a PDCCH addressed to a specific RNTI on a specific search space while the timer is running. The UE may receive DCI with CRC scrambled by (e.g., addressed to) the specific RNTI in action 408. The DCI may indicate a response/feedback. The specific RNTI may be configured by the RRC release message received in action 402. The specific RNTI may include at least one of a C-RNTI and a CS-RNTI. The specific search space may be indicated by the SDT configuration received in action 402 and/or the CG configuration for SDT received in action 402.

The UE may stop the timer upon receiving an indication from the BS. The UE may monitor the PDCCH for the indication in action 408. In one implementation, the indication may indicate Downlink Feedback Information (DFI). In one implementation, the indication may be a response/feedback associated with the transmission initiated in action 404. In one implementation, the indication may indicate a specific UL grant for a new transmission associated with a HARQ process used for the transmission initiated in action 404. The new transmission scheduled by the specific UL grant may use the same HARQ process ID as the transmission initiated in action 404.

In one implementation, the UE may stop the timer when a Time Alignment (TA) timer expires. For example, the UE may stop the timer when the UE considers the TA invalid. In one implementation, the UE may stop the timer when the CG resource/configuration is released (or cleared/suspended). In one implementation, the UE may stop the timer when the UE receives an indication from the network indicating that the SDT procedure is stopped/terminated.

In one implementation, the UE may initiate an RA procedure when the timer expires. For example, the UE may be configured to monitor a feedback in response to the transmission initiated in action 404 while the timer is running. The UE may determine the transmission is unsuccessful (due to failure in receiving the feedback) when the timer expires. The UE may consider the current channel quality as not qualified for SDT and therefore may attempt to use the RA procedure for SDT and/or attempt to switch to the RRC_CONNECTED state by initiating the RA procedure. The RA procedure may be an RA procedure for SDT. The RA procedure may be an RA procedure not for SDT.

Figure 5:
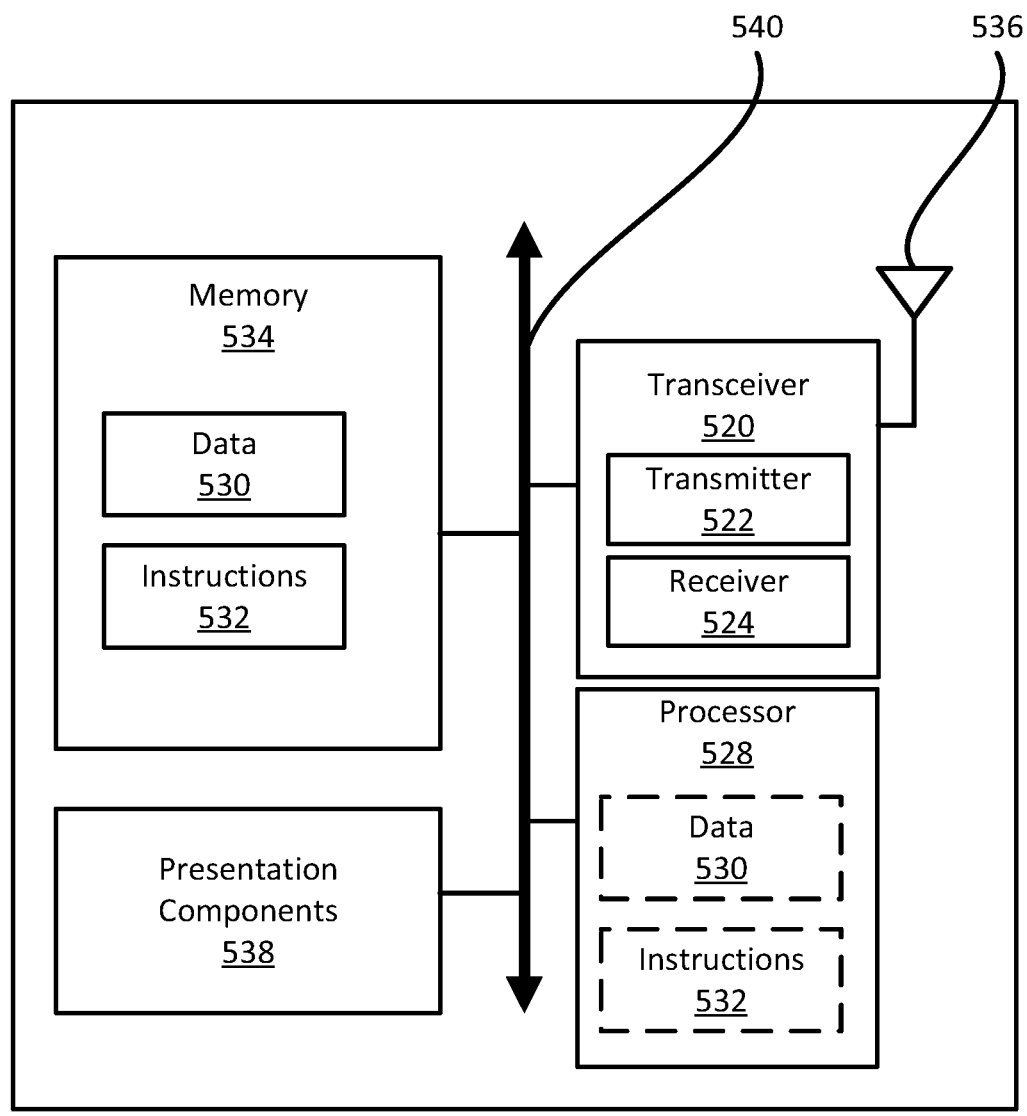
FIG. 5 is a block diagram illustrating a node for wireless communication, according to an example implementation of the present disclosure.

FIG. 5 is a block diagram illustrating a node 500 for wireless communication according to an example implementation of the present disclosure. As illustrated in FIG. 5, the node 500 may include a transceiver 520, a processor 528, a memory 534, one or more presentation components 538, and at least one antenna 536. The node 500 may also include a radio frequency (RF) spectrum band module, a BS communications module, a network communications module, and a system communications management module, Input/Output (I/O) ports, I/O components, and a power supply (not illustrated in FIG. 5).

Each of the components may directly or indirectly communicate with each other over one or more buses 540. The node 500 may be a UE or a BS that performs various functions disclosed with reference to FIGS. 1 through 4.

The transceiver 520 has a transmitter 522 (e.g., transmitting/transmission circuitry) and a receiver 524 (e.g., receiving/reception circuitry) and may be configured to transmit and/or receive time and/or frequency resource partitioning information. The transceiver 520 may be configured to transmit in different types of subframes and slots including but not limited to usable, non-usable, and flexibly usable subframes and slot formats. The transceiver 520 may be configured to receive data and control channels.

The node 500 may include a variety of computer-readable media. Computer-readable media may be any available media that may be accessed by the node 500 and include both volatile and non-volatile media, and removable and non-removable media.

The computer-readable media may include computer storage media and communication media. Computer storage media may include both volatile and non-volatile media, and removable and non-removable media implemented in any method or technology for storage of information such as computer-readable instructions, data structures, program modules or data.

Computer storage media may include RAM, ROM, EPROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media may not include a propagated data signal. Communication media may typically embody computer-readable instructions, data structures, program modules or other data in a modulated data signal such as a carrier wave or other transport mechanism and include any information delivery media.

The term "modulated data signal" means a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components should also be included within the scope of computer-readable media.

The memory 534 may include computer-storage media in the form of volatile and/or non-volatile memory. The memory 534 may be removable, non-removable, or a combination thereof. Example memory may include solid-state memory, hard drives, optical-disc drives, etc. As illustrated in FIG. 5, the memory 534 may store computer-readable, computer-executable instructions 532 (e.g., software codes) that are configured to cause the processor 528 to perform various functions disclosed herein, for example, with reference to FIGS. 1 through 4. Alternatively, the instructions 532 may not be directly executable by the processor 528 but be configured to cause the node 500 (e.g., when compiled and executed) to perform various functions disclosed herein.

The processor 528 (e.g., having processing circuitry) may include an intelligent hardware device, e.g., a Central Processing Unit (CPU), a microcontroller, an ASIC, etc. The processor 528 may include memory. The processor 528 may process the data 530 and the instructions 532 received from the memory 534, and information transmitted and received via the transceiver 520, the base band communications module, and/or the network communications module. The processor 528 may also process information to be sent to the transceiver 520 for transmission via the antenna 536 to the network communications module for transmission to a core network.

One or more presentation components 538 may present data indications to a person or another device. Examples of presentation components 538 may include a display device, a speaker, a printing component, and a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A method performed by a User Equipment (UE) for small data transmission (SDT), the method comprising:
   receiving a Radio Resource Control (RRC) release message from a Base Station (BS), the RRC release message indicating an SDT configuration including a Configured Grant (CG) configuration and a timer;
   initiating a transmission on an Uplink (UL) resource while the UE is in an RRC_INACTIVE state, the UL resource being either configured by the CG configuration or scheduled by a UL grant from the BS;
   starting or restarting the timer after initiating the transmission; and
   monitoring a Physical Downlink Control Channel (PDCCH) addressed to a specific Radio Network Temporary Identifier (RNTI) on a specific search space while the timer is running.

2. The method of claim 1, further comprising:
   stopping the timer upon receiving an indication from the BS.

3. The method of claim 2, wherein the indication indicates Downlink Feedback Information (DFI).

4. The method of claim 2, wherein the indication indicates a specific UL grant for a new transmission associated with a Hybrid Automatic Repeat Request (HARM) process used for the transmission.

5. The method of claim 1, further comprising:
   stopping the timer when a Time Alignment (TA) timer expires.

6. The method of claim 1, further comprising:
   stopping the timer when the CG configuration is released.

7. The method of claim 1, further comprising:
   initiating a Random Access (RA) procedure when the timer expires.

8. The method of claim 1, wherein the specific search space is indicated by the SDT configuration.

9. The method of claim 1, wherein the specific RNTI includes at least one of a Cell-RNTI (C-RNTI) and a Configured Scheduling-RNTI (CS-RNTI).

10. The method of claim 1, wherein the timer is included in the CG configuration.

11. A user equipment (UE) for small data transmission (SDT), the UE comprising:
    one or more processors; and
    at least one memory coupled to at least one of the one or more processors, wherein the at least one memory stores a computer-executable program that, when executed by the at least one of the one or more processors, causes the UE to:
    receive a Radio Resource Control (RRC) release message from a Base Station (BS), the RRC release message indicating an SDT configuration including a Configured Grant (CG) configuration and a timer;

initiate a transmission on an Uplink (UL) resource while the UE is in an RRC_INACTIVE state, the UL resource being either configured by the CG configuration or scheduled by a UL grant from the BS;
start or restart the timer after initiating the transmission; and
monitor a Physical Downlink Control Channel (PDCCH) addressed to a specific Radio Network Temporary Identifier (RNTI) on a specific search space while the timer is running.

12. The UE of claim 11, wherein the computer-executable program, when executed by the processor, further causes the UE to:
stop the timer upon receiving an indication from the BS.

13. The UE of claim 12, wherein the indication indicates Downlink Feedback Information (DFI).

14. The UE of claim 12, wherein the indication indicates a specific UL grant for a new transmission associated with a Hybrid Automatic Repeat Request (HARQ) process used for the transmission.

15. The UE of claim 11, wherein the computer-executable program, when executed by the processor, further causes the UE to:
stop the timer when a Time Alignment (TA) timer expires.

16. The UE of claim 11, wherein the computer-executable program, when executed by the processor, further causes the UE to:
stop the timer when the CG configuration is released.

17. The UE of claim 11, wherein the computer-executable program, when executed by the processor, further causes the UE to:
initiate a Random Access (RA) procedure when the timer expires.

18. The UE of claim 11, wherein the specific search space is indicated by the SDT configuration.

19. The UE of claim 11, wherein the specific RNTI includes at least one of a Cell-RNTI (C-RNTI) and a Configured Scheduling-RNTI (CS-RNTI).

20. The UE of claim 11, wherein the timer is included in the CG configuration.

* * * * *